US 7,054,283 B2
(12) United States Patent
Carlsson et al.

(10) Patent No.: US 7,054,283 B2
(45) Date of Patent: May 30, 2006

(54) WIRELESS NETWORK ARCHITECHTURE AND PROTOCOL FOR LOCATION SERVICES IN GPRS PACKET DATA NETWORK

(75) Inventors: Hans Carlsson, Cary, NC (US); Lennart Rinnback, Jarfalla (SE)

(73) Assignee: Ericsson Inc., Research Triangle Park, NC (US)

( * ) Notice: Subject to any disclaimer, the term of this patent is extended or adjusted under 35 U.S.C. 154(b) by 919 days.

(21) Appl. No.: 09/887,630

(22) Filed: Jun. 22, 2001

(65) Prior Publication Data

US 2002/0110096 A1 Aug. 15, 2002

Related U.S. Application Data

(60) Provisional application No. 60/268,468, filed on Feb. 13, 2001.

(51) Int. Cl.
*H04Q 7/00* (2006.01)
*H04J 3/24* (2006.01)

(52) U.S. Cl. ............... 370/328; 370/349; 370/389; 455/422; 455/456

(58) Field of Classification Search ............... 370/328, 370/346, 350; 455/423, 424, 426, 432–435, 455/466, 440, 461; 340/539.13
See application file for complete search history.

(56) References Cited

U.S. PATENT DOCUMENTS 5,845,211 A * 12/1998 Roach, Jr. ............... 455/436
6,167,040 A * 12/2000 Haeggstrom ............... 370/352

6,259,923 B1 * 7/2001 Lim et al. ............... 455/466
6,522,889 B1 * 2/2003 Aarnio ............... 455/456.5
2001/0005675 A1 * 6/2001 Aho ............... 455/466

FOREIGN PATENT DOCUMENTS

WO WO 00 30393 A 5/2000
WO WO 00 35236 A 6/2000

OTHER PUBLICATIONS

ETSI TS 101 724 V8.0.0 (Aug. 2000); Digital Cellular Telecommunications System (Phase 2+); Location Services (LCS); (Functional description)—Stage 2 (GSM 03.71 version 8.0.0 Release 1999); GSM; ETSI; (107 pages).
3G TS 23.271 V1.1.0 (Nov. 2000); 3GPP; 3$^{rd}$ Generation Partnership Project; Technical Specification Group Services and System Aspects; Functional stage 2 description of LCS (Release 2000); 3GPP; (57 pages).

(Continued)

*Primary Examiner*—Alpus H. Hsu
*Assistant Examiner*—Justin M. Philpott
(74) *Attorney, Agent, or Firm*—Coats & Bennett, P.L.L.C.

(57) ABSTRACT

A method and apparatus for transmitting a location service message between a location server and a mobile station or LMU in a GPRS wireless communications system. The location server generates a location service message and transmits the location service message to a base station subsystem; the base station subsystem forwards the location service message to a serving GPRS support node; the serving GPRS support node then forwards the location service message to a mobile station or LMU), passing transparently back through the base station subsystem. This approach to system routing of location messages allows existing circuit-switched wireless communications systems to support location services in a GPRS environment with a minimum of alterations to existing hardware and software protocols.

20 Claims, 9 Drawing Sheets

OTHER PUBLICATIONS

3G TS 23.060 V3.3.1 (May 2000); 3rd Generation Partnership Project; Technical Specification Group Services and System Aspects; General Packet Radio Service (GPRS); Service description; Stage 2 (Release 1999); 3GPP; (185 pages).

3GPP TS 04.18 V8.7.0 (Nov. 2000); 3rd Generation Partnership Project; Technical Specification Group GSM EDGE Radio Access Network; General Packet Radio Service (GPRS); Base Station System (BSS)—Serving GPRS Support Node (SGSN); BSS GPRS Protocol (BSSGP) (Release 1999); 3GPP; (69 pages).

3GPP TS 09.31 V8.3.0 (Oct. 2000); 3rd Generation Partnership Project; Technical Specification Group GSM EDGE Radio Access Network; Location Services (LCS); Base Station System Application Part LCS Extension (BSSAP-LE) (Release 1999); 3GPP; (47 pages).

ETSI TS 101 351 V8.4.0 (Aug. 2000); Digital Cellular Telecommunications System (Phase 2+); General Packet Radio Service (GPRS); Mobile Station—Serving GPRS Support Node (MS-SGSN) Logical Link Control (LLC) layer specification (GSM 04.64 version 8.4.0 Release 1999); GSM; ETSI; (63 pages).

ETSI TS 101 299 V8.0.0 (Mar. 2000); Digital Cellular Telecommunications System (Phase 2+); General Packet Radio Service (GPRS); Base Station System (BSS); Serving GPRS Support Node (SGSN) interface; Network Service (GSM 08.16 version 8.0.0 Release 1999); GSM; ETSI; (37 pages).

3GPP TS 04.31 V8.3.0 (Jan. 2001); 3rd Generation Partnership Project; Technical Specification Group GSM EDGE Radio Access Network; Location Services (LCS); Mobile Station (MS)—Serving Mobile Location Centre (SMLC) Radio Resource LCS Protocol (RRLP) (Release 1999); GSM; 3GPP; (56 pages).

3GPP TS 08.71 V8.2.0 (Nov. 2000); 3rd Generation Partnership Project; Technical Specification Group GSM EDGE Radio Access Network; Location Services (LCS); Serving Mobile Location Centre—Base Station System (SMLC-BSS) interface; Layer 3 specification (Release 1999); GSM; 3GPP; (15 pages).

3GPP TSG GERAN LCS AdHoc #4 entitled "BSS+ Protocol Architecture to Support LCS in GPRS;" Ericsson; (13 pages).

* cited by examiner

WIRELESS NETWORK ARCHITECHTURE AND PROTOCOL FOR LOCATION SERVICES IN GPRS PACKET DATA NETWORK

This application claims benefit of U.S. Provisional Application 60/268,468, filed Feb. 13, 2001.

BACKGROUND OF THE INVENTION

The present invention relates generally to the field of wireless communications systems, and specifically to Location Services for use with General Packet Radio Service.

Global System for Mobile Communications (GSM) is a global standard for wireless telecommunications. Various GSM defined standards (GSM 900, GSM 1800, GSM 1900, etc.) have been deployed to provide cellular radiocommunication services in many countries around the world. The GSM standard was developed primarily for voice communications, but is also used to provide circuit-switched data services that require a continuous connection. The General Packet Radio Service (GPRS) is a recent extension of the GSM standard to provide packet switched data services to GSM mobile stations. Packet-switched data services are used for transmitting small amounts of data or for data transfers of an intermittent or bursty nature. Typical applications for GPRS include Internet browsing, wireless e-mail, and credit card processing. GPRS is described more fully in "3rd Generation Partnership Project; Technical Specification Group Services and System Aspects; General Packet Radio Service (GPRS); Service description; Stage 2 (Release 1999)," the disclosure of which is incorporated herein by reference.

The GSM standard is capable of providing a variety of information services to subscribers. Location Services (LCS) is one example of an information service that GSM provides. LCS allows a subscriber or client to obtain or determine the location of a GSM mobile station operating within the GSM network. The location may be determined by the network, based on measurements supplied by the mobile station, or may be determined by the mobile station itself and communicated to the network. Various approaches to position estimation may be used, including Uplink Time of Arrival (TOA), Enhanced Observed Time Difference (E-OTD), and assisted Global Positioning System (GPS). LCS is described more fully in "Digital cellular telecommunications system (Phase 2+); Location Services (LCS); (Functional description)—Stage 2 (GSM 03.71 version 8.0.0 Release 1999)."

In the current GSM standard, a centralized server known as the Serving Mobile Location Center (SMLC) manages the overall coordination and scheduling of resources required to perform positioning of a mobile station. In order to perform these functions, the SMLC must exchange information with other entities within the network, such as the mobile station and/or a Location Measuring Unit (LMU). This location information may be the position of the mobile station, measurements from which the position of the mobile station may be determined, or data otherwise useful in determining the position of the mobile terminal. For instance, the location information may be that discussed in "3rd Generation Partnership Project; Technical Specification Group GSM EDGE Radio Access network; Mobile Station (MS)—Serving Mobile Location Centre (SMLC) Radio Resources LCS Protocol (RRLP)" (Release 1999, v8.3.1), incorporated herein by reference.

Communication protocols permit the orderly exchange of information between nodes or entities within a network. Communication protocols to support LCS information exchange in conventional circuit-switched GSM networks have been developed. In contrast, communication protocols for GPRS networks are still in development and have not been finalized. Thus, many aspects of the communication protocol needed to support LCS in a GPRS network remain unresolved.

SUMMARY OF THE INVENTION

The present invention provides a method and apparatus for transmitting a location service message between a location server and a mobile station in a GPRS wireless communications system. The location server generates a location service message and transmits the location service message to a base station subsystem; the base station subsystem forwards the location service message to a serving GPRS support node; the serving GPRS support node then forwards the location service message to a mobile station, passing transparently back through the base station subsystem. The flow of location service messages from the mobile station to the location server may follow the reverse path. This approach to system routing of location messages allows existing circuit-switched wireless communications systems to support location services in a GPRS environment with a minimum of alterations to existing hardware and software protocols.

DETAILED DESCRIPTION OF THE INVENTION

Figure 1:
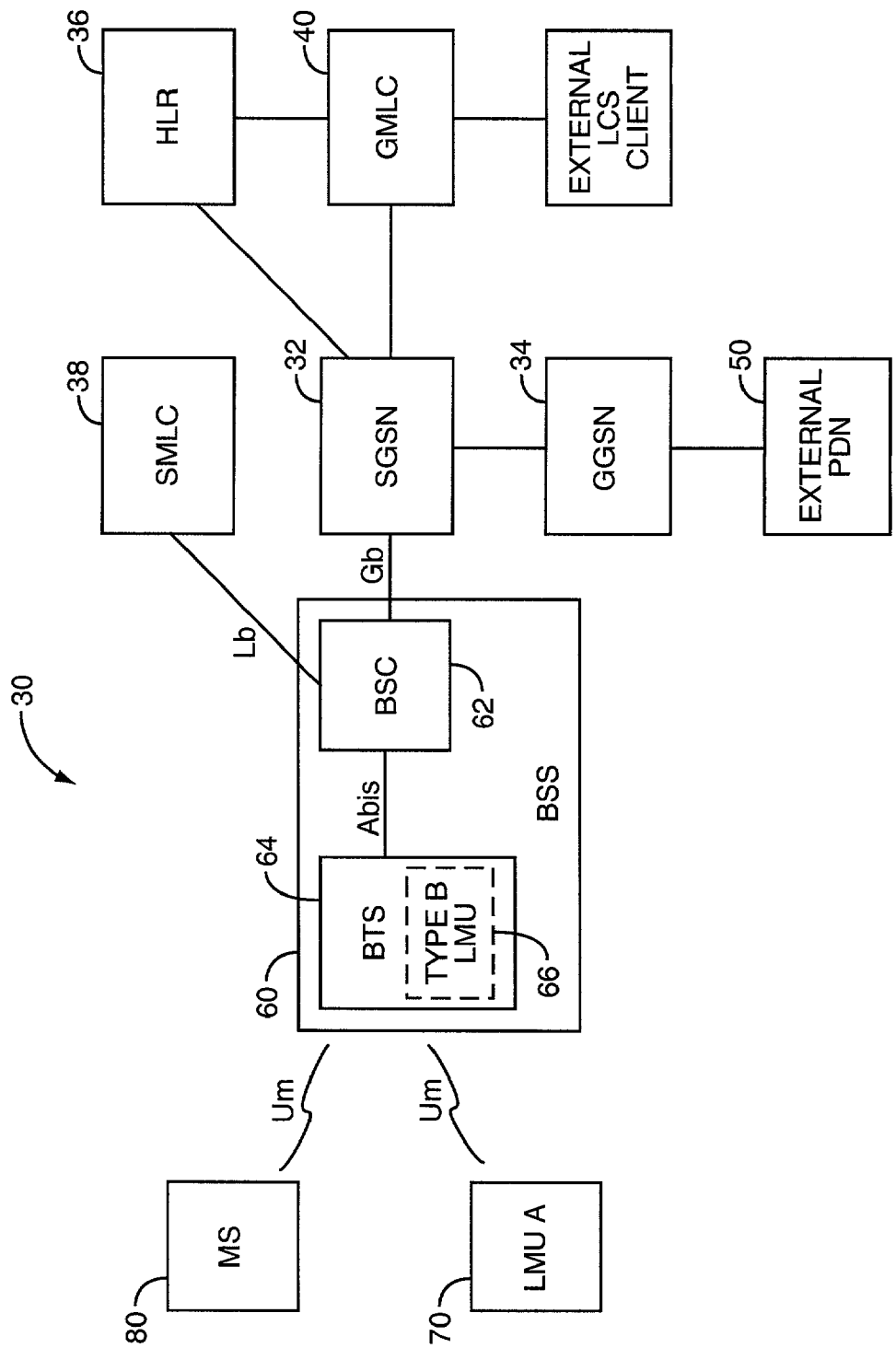
FIG. 1 is a functional block diagram of a GPRS packet data network according to the present invention.

FIG. 1 shows the logical architecture of a packet-switched network 30 implementing General Packet Radio Service (GPRS) developed for Global System for Mobile Communications (GSM). The packet-switched network 30 of FIG. 1 comprises at least one Serving GPRS Support Node (SGSN) 32, a Gateway GPRS Support Node (GGSN) 34, a Home Location Register (HLR) 36, a Serving Mobile Location Center (SMLC) 38, a Gateway Mobile Location Center (GMLC) 40, a Base Station Subsystem (BSS) 60, an optional Location Measuring Unit (LMU) 70, and a mobile station (MS) 80.

The SGSN 32 contains the functionality required to support GPRS. SGSN 32 provides network access control for packet-switched network 30. Network access is the means by which a user is connected to a telecommunications network in order to use the services of the network. The SGSN 32 connects to the BSS 60, typically by a Frame Relay Connection. In the packet-switched network 30, there may be more than one SGSN 32.

The GGSN 34 provides interworking with external packet-switched networks, referred to as packet data networks (PDN) 50, and is typically connected to the SGSN 32 via a backbone network using the X.25 or TCP/IP protocol. The GGSN 34 may also connect the packet-switched network 30 to other public land mobile networks (PLMN). The GGSN 34 is the node that is accessed by the external packet data network 50 to deliver packets to a mobile station 80 addressed by a data packet. Data packets originating at the mobile station 80 addressing nodes in the external PDN 50 also pass through the GGSN 34. Thus, the GGSN 34 serves as the gateway between users of the packet-switched network 30 and the external PDN 50, which may, for example, be the Internet or other global network. The SGSN 32 and GGSN 34 functions can reside in separate nodes of the packet-switched network 30 or may be in the same node.

The HLR 36 stores subscriber information and the current location of the subscriber. As the mobile station 80 moves about within the network, it periodically registers with the network so that the network can track the whereabouts of the mobile station 80. The network updates the location information in the HLR 36 when needed. When a call intended for a mobile station 80 is received at the SGSN 32, the SGSN 32 sends a query to the HLR 36 to get the current location of the mobile station 80 to use in routing the call.

The SMLC 38 contains functionality required to support LCS. The SMLC 38 manages the overall coordination and scheduling of resources required to perform positioning of a mobile station 80 and is therefore sometimes referred to as the location server. The SMLC 38 may calculate the final location estimate of the mobile station 80 and the accuracy thereof. The overall functionality of the SMLC 38 may be that set forth in "Digital cellular telecommunications system (Phase 2+); Location Services (LCS); (Functional description)—Stage 2 (GSM 03.71 version 8.0.0 Release 1999)," the disclosure of which is incorporated herein by reference. In the packet-switched network 30, there may be more than one SMLC 38.

The GMLC 40 also contains functionality required to support LCS. The GMLC 40 is the first node an external LCS client accesses in a GSM network 30. The GMLC 40 may request routing information from the HLR 36 via an appropriate interface. The overall functionality of the GMLC 40 may be that set forth in "Digital cellular telecommunications system (Phase 2+); Location Services (LCS); (Functional description)—Stage 2 (GSM 03.71 version 8.0.0 Release 1999)," referenced above. In the packet-switched network 30, there may be more than one GMLC 40. The BSS 60, which includes a Base Station Controller (BSC) 62 and one or more Base Transceiver Stations (BTS) 64, provides an interface between mobile stations 80 and the network 30. The BTS 64 contains radio transmission and reception equipment, up to and including the antennas, and also contains the signal processing specific to the radio interface. The BSC 64 connects the BTS 62 with the SGSN 32 and performs most management and control functions of the BSS 60. The main functions of the BSC 64 include allocation and release of radio channels, and handover management.

The optional LMU 70 makes radio measurements to support one or more positioning methods, in fashions well known in the art. The LMU may be of a type A, wherein the LMU 70 is accessed over the normal GSM air interface. Alternatively, the LMU may be type B, wherein the LMU 66 is accessed over a special interface (known as Abis). While type B LMUs 66 may be stand-alone network elements, they may also be integrated into a BTS 64 as shown in FIG. 1.

The mobile station 80 may take any form known in the art. For purposes of discussion herein, the mobile station 80 is assumed to be a GSM adapted mobile station with LCS and GPRS capability. The mobile station 80 registers with the SGSN 32 to receive packet data services in a conventional fashion. Registration is the process by which the mobile terminal ID is associated with the user's address(es) in the packet-switched network 30 and with the user's access point(s) to the external PDN 50. After registration, the mobile station 80 typically camps on a Common Control Channel (CCCH) or a Packet Common Control Channel (PCCCH).

As discussed above, location service messages flow between the mobile station 80 and the SMLC 38. These location service messages may aid the mobile station 80 in determining it position, aid the mobile terminal in taking position related measurements, and/or aid the SMLC 38 in estimating the position of the mobile station 80, depending on the location measurement approach taken. For instance, the location service messages may comprise so-called assistance data, such as GPS almanac data, GPS ephemeris data, or the like, provided by the SMLC 38 to the mobile station 80. Alternatively, the location service messages may be timed signal measurements, or the like, provided by the mobile station 80 to the SMLC 38. While the SMLC 38 communicates with the mobile station 80 using the physical layer air interface provided by the BSS 60, the particular protocol and routing used for the location service messages may vary. The present invention provides one such protocol and routing used for communicating location service messages between the mobile station 80 and the SMLC 38.

Figure 2:
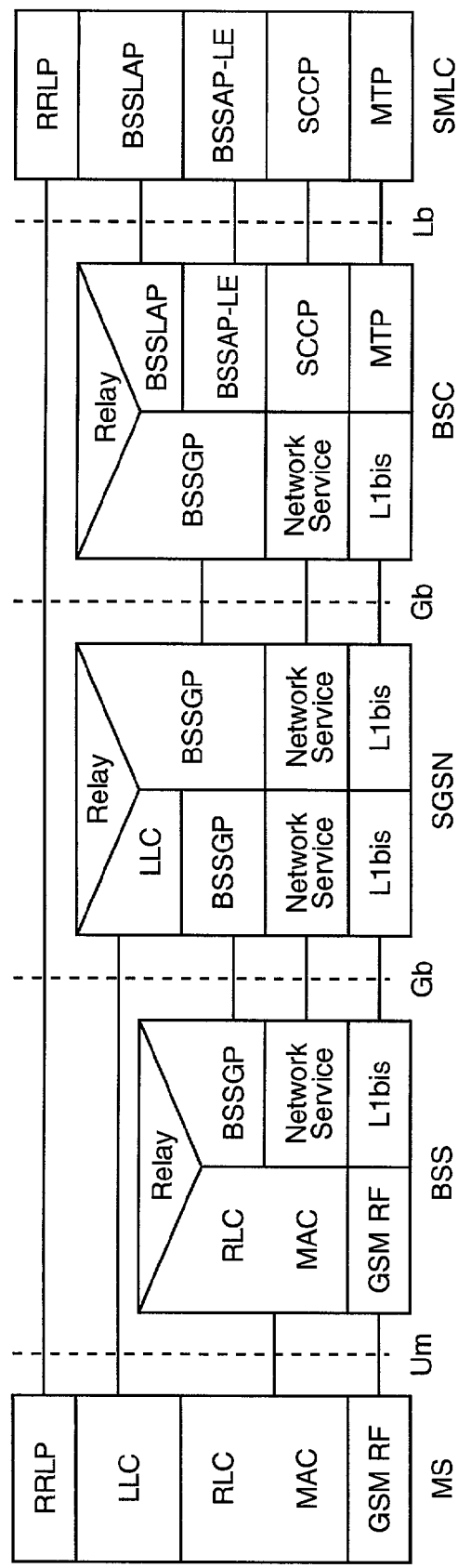
FIG. 2 is a protocol model for communications between a location server and a mobile station according to the present invention.

FIG. 2 shows a protocol model used for transmitting location service messages between a location server and a mobile station 80. Location service messages are messages used to transmit data and signaling information related to LCS. The protocol model shown in FIG. 2 uses a layered protocol stack, with each layer performing defined functions. The protocol stack includes transfer control procedures (e.g., flow control, error detection, error correction, and error recovery) to facilitate information transfer between the various entities.

The Radio Resource LCS Protocol (RRLP) is the protocol used to transfer LCS related information between the mobile station 80 and a location server, such as the SMLC 38. RRLP messages, referred to herein generically as location service messages, are used by the location server, for example, to send a Position Request Message or to send assistance data to a mobile station 80. The mobile station 80 may use location service messages, for example, to request assistance data from the location server or to transmit position information to the location server in response to a Position Request Message. The RRLP is an application-level protocol. All RRLP messages are transmitted transparently between the location server and mobile station 80.

The BSS LCS Assistance Protocol (BSSLAP) and the BSSAP LCS Extension (BSSAP-LE) support LCS signaling between the SMLC 38 and BSS 60. BSSLAP supports specific LCS functions (e.g., positioning measurements, assistant measurements) and is independent of lower protocol layers. The BSSLAP layer may be absent if its functions are supported in the BSSAP-LE layer. The BSSAP-LE layer is an extension of the BSS Assistance Protocol. This layer carries the BSSLAP signaling units. The functions of the BSSAP-LE layer include identification of the BSSLAP version and identification, where not provided by the network layer, of the two end points. This layer supports segmentation of BSSLAP messages that exceed the message size limitations of lower layer protocols.

The Signaling Connection Control Part (SCCP) is the protocol used to transport messages over an SS7 network. SCCP provides end-to-end routing of messages over a network. The SCCP layer contains addressing data necessary to deliver data to the specified destination. This addressing information is used at each signaling point or node in the network to determine how the message should be routed. SCCP is described in ANSI T1.112 and/or ITU-T Q.711.

The Message Transfer Part (MTP) comprises three layers that correspond to the physical layer (layer 1), data link layer (layer 2), and network layer (layer 3) of the OSI reference model. The MTP layer acts as an interface between the SCCP layer and the physical channel. Layer 1 is responsible for converting data signals into a bit stream suitable for transmission over the network. Layer 2 is responsible for delivery of messages over a signaling link between two adjacent signaling points or nodes in the network. Functions performed at this level include error detection and correction and sequencing of data that has been broken up for transmission over the network. Layer 3 performs several functions, including message discrimination, message distribution, message routing, and network management. Message discrimination determines to whom a message is addressed. If the message is addressed to the local node, the message is passed to message distribution. If the message is not addressed to the local node, it is passed to message routing. The message distribution function routes messages to the designated entity within the node. Message routing determines which length to use to transmit a message and sends the message back to Layer 2 for transmission on the designated length. Layer 3 also performs network management functions. These functions are not material to the invention and are not described herein. The MTP is described in ANSI publication T1.111 and/or ITU-T Q.701.

The BSS GPRS Protocol (BSSGP) conveys routing and quality of service (QOS) related information between the BSS 60 and SGSN 32. In the present invention, the BSSGP provides transport of RRLP messages between SMLC 38 and SGSN 32. BSSGP also provides transport of LLC frames between SGSN 32 and BSS 60. In the BSC 62, RRLP messages are unpacked from BSSLAP frames and placed into BSSGP frames. The RRLAP messages are unpacked from BSSGP frames at SGSN 32 and placed into LLC frames. LLC frames, in turn, are carried in a BSSGP message to BSS 60 where the LLC frame is unpacked and placed in RLC/MAC frames. This process is reversed in uplink communications from the mobile station 80 to the SMLC 38. The BSSGP is specified in GSM 08.18.

The existing BSSGP protocol does not provide for transport of RRLP messages between the BSS 60 and SGSN 32. The BSSGP can be easily modified by those skilled in the art to provide this transport function by adding an additional message to the BSSGP message set or, possibly, by modifying existing messages within the BSSGP message set to include new information elements. Messages used to transport RRLP messages between the BSS 60 and SGSN 32 are referred to herein as RRLP transport messages.

The Network Service (NS) layer transports BSSGP signaling units between the BSS 60 and SGSN 32. Services provided by this layer are typically based on a Frame Relay Connection between the BSS 60 and SGSN 32, but may alternatively be based on an IP connection such as that described in 3GPP TS 28.016. The frame relay circuits may be multi-hop and traverse a network of Frame Relay switching nodes. Frame Relay is used for signaling and data transmission. The NS layer is described in GSM 08.16.

The RLC/MAC layer contains two functions: the Radio Link Control function and Medium Access Control function. The Radio Link Control function provides a radio solution dependent reliable link. The Medium Access Control function controls the access signaling (request and grant) procedures for the radio channel and the mapping of LLC frames onto the GSM physical channel. RLC/MAC is defined in GSM 04.60.

Figure 3:
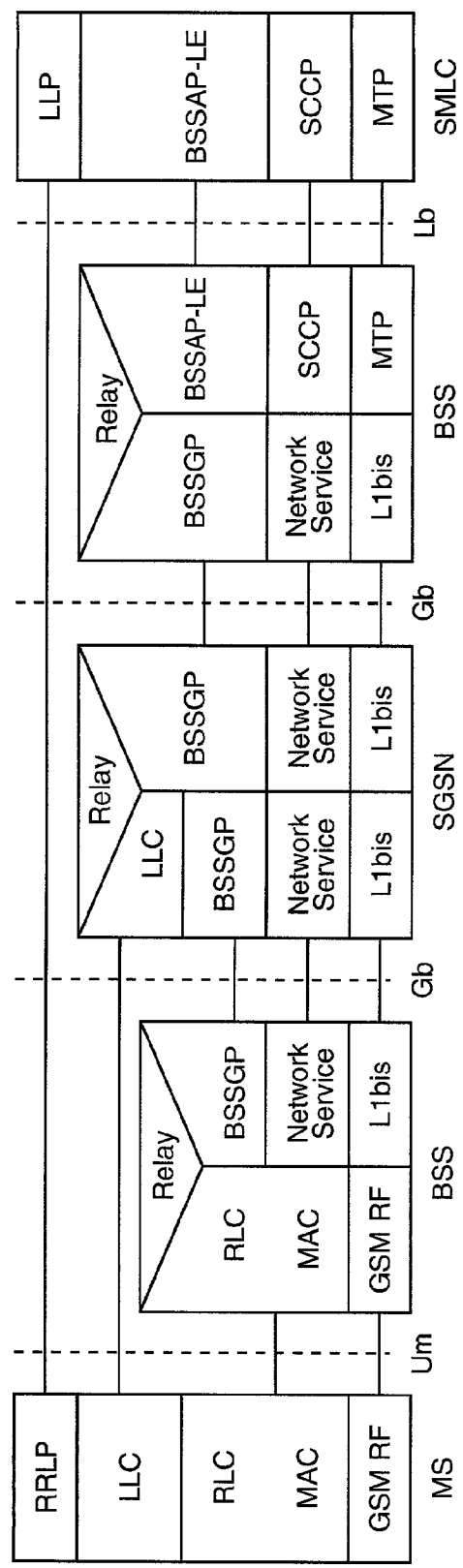
FIG. 3 is a protocol model for communications between a location server and a Type A location measurement unit according to the present invention.

FIG. 3 shows a protocol model used for transmitting location service messages between a location server and Type A LMU 70. This protocol model is similar to that shown in FIG. 2. However, the top level protocol of the protocol model shown in FIG. 3 is the LMU LCS Protocol (LLP). The LLP is the protocol used to transfer LCS-related information between a location server, such as the SMLC 38, and a LMU, such as Type A LMU 70 or type B LMU 66. Thus, LLP messages are another type of location service messages used by the SMLC 38 for communication with an LMU. The protocol model for communications between the SMLC 38 and Type A LMU 70 omits the BSSLAP layer shown in FIG. 2. The functions of the BSSLAP layer in FIG. 2 are incorporated into the BSSAP-LE layer in FIG. 3. The BSSGP protocol is used to transport LLP messages between the BSS 60 and SGSN 32. The BSSGP would need to be modified to perform this transport function as previously described by adding a new message to the BSSGP message set, or by adding new information elements to existing BSSGP messages.

Figure 4:
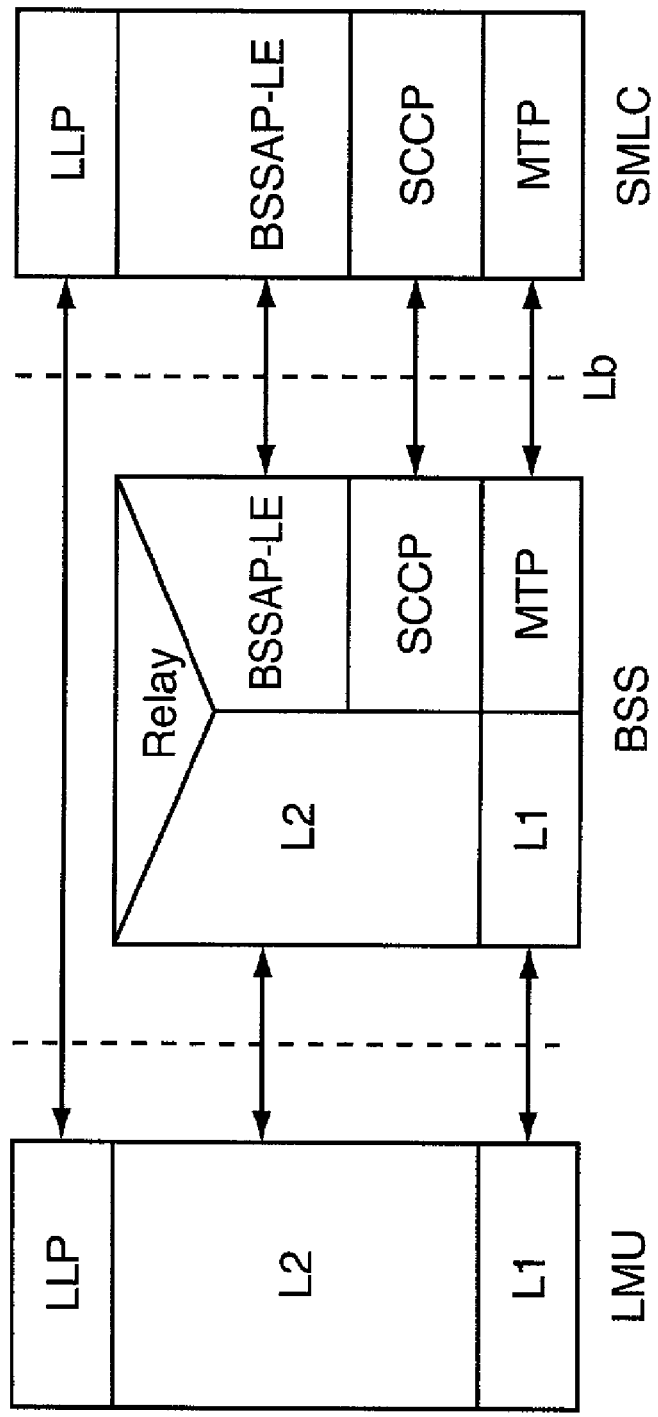
FIG. 4 is a protocol model for communications between a location server and a Type B location measurement unit according to the present invention.

FIG. 4 is a protocol model for communications between a location server, such as the SMLC 38, and Type B LMU 66. The top level protocol in this protocol model is the LLP. The BSSAP-LE is used to transport LLP messages between the SMLC 38 and BSC 62. Layer 1 (L1) and Layer 2 (L2) protocols provide transport for LLP messages between the BSC 62 and Type B LMU 66. This protocol model is the same as the protocol model used in circuit-switched GSM networks, which is well known to those skilled in the art, and would not require modifications.

Figure 5:
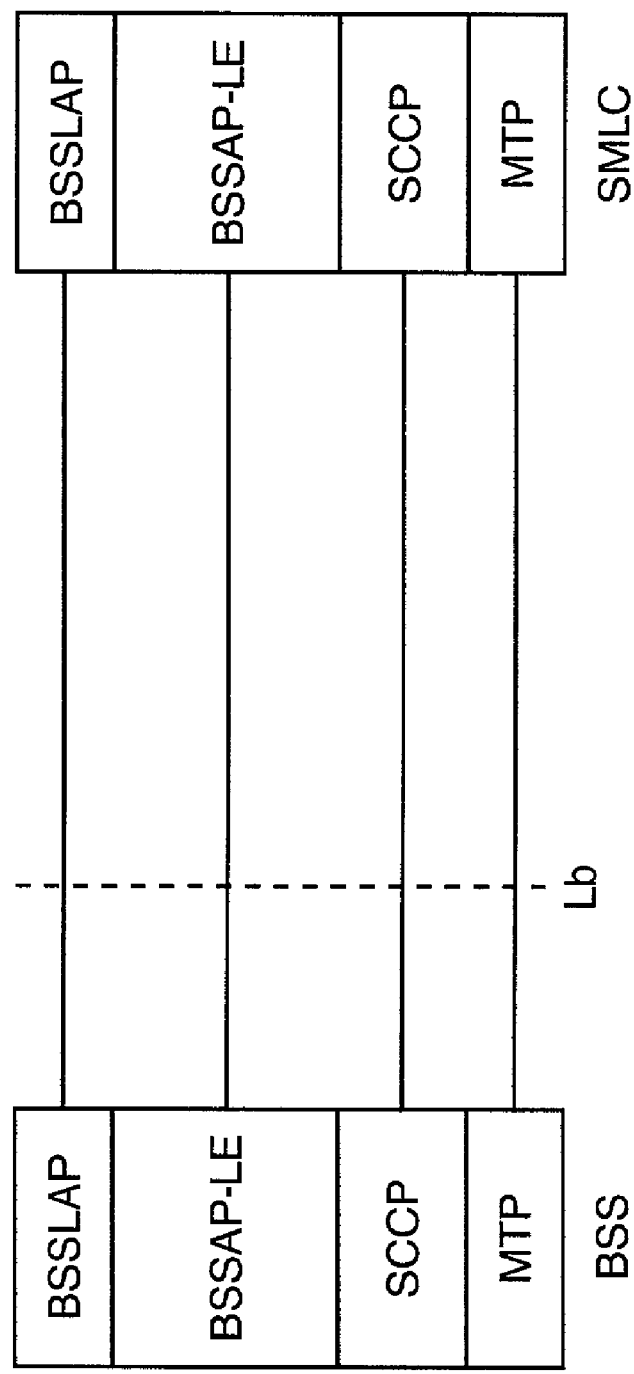
FIG. 5 is a protocol model for communications between a location server and a base station subsystem according to the present invention.

FIG. 5 is the protocol model for communications between the location server, such as SMLC 38, and BSS 60. This protocol model is used when the BSC 62 is one end point for the communication and the SMLC 38 is the other end point. The top level protocol in this protocol model is the BSSLAP. Note that in this protocol model, the SCCP and MTP provide transport for messages in the higher protocol layers. The SCCP and MTP layers could be replaced by IP transport. The protocol model shown in FIG. 5 is currently used in circuit-switched GSM networks and does not require modification for the present invention.

Figure 6:
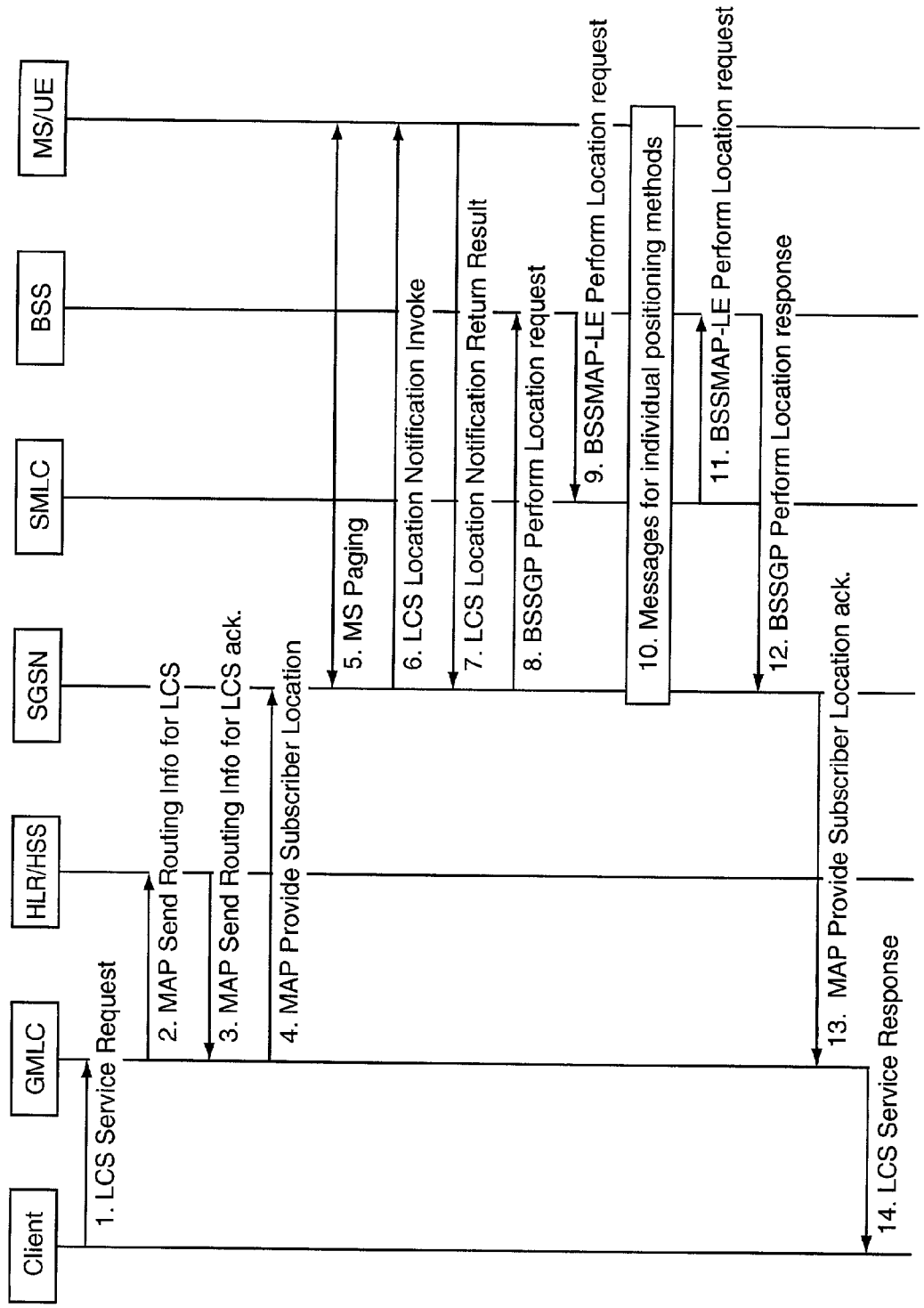
FIG. 6 is a call flow diagram illustrating signaling between a location services client and location server.

An exemplary situation where the present invention may advantageously be employed is shown in FIG. 6. An LCS client, such as an external LCS client, sends a LCS service request to the GMLC 40 (arrow 1). The GMLC 40 sends a routing information request to the HLR 36 (arrow 2), which responds by returning the appropriate routing information to the GMLC 40 (arrow 3). The GMLC 40 then sends a provide subscriber location request to the SGSN 32 (arrow 4). If the GMLC 40 is located in another PLMN or another country, the SGSN 32 may authenticate that a location request is allowed from that PLMN (or that country) before proceeding, with appropriate error response if the location request is not authorized. The SGSN 32 may then verify that any restrictions on location requests associated with the mobile station 80 are satisfied, once again with appropriate error messages/responses if they are not met. If the mobile station 80 is suspended or not attached, the SGSN 32 may return an error response to the GMLC 40. If the mobile station 80 is in stand-by mode, the SGSN 32 and the mobile station 80 perform a page/response (arrow 5). The mobile station 80 should return the current cell identification in the BSSGP message of the page response. In addition, if the mobile station 80 supports any mobile station-based or mobile station-assisted positioning methods, the mobile station 80 may also provide the SGSN 32 with an indication of which positioning methods it supports during the attach procedure. Because the mobile station 80 may place restrictions on the dissemination of its location, the SGSN 32 may be required to send a LCS Location Notification Invoke message to the mobile station 80 (arrow 6) to notify the mobile station 80 of the identity of the entity requesting the mobile station's location and/or wait for user to grant or withhold permission for the information to be released ("privacy verification"). Next, the mobile station 80 responds to the notification/permission request by sending an appropriate message to the SGSN 32 (arrow 7). If the mobile station 80 does not respond within a predetermined time, the SGSN 32 may infer a "no response" condition and notify the GMLC 40 appropriately, such as indicating a permission denial. Optionally, the SGSN 32 may continue the location process in parallel, without waiting for the mobile station 80 to respond to the notification/permission request (with appropriate later safeguards in the later case).

Assuming the inquiry is authorized, the SGSN 32 sends a "perform location request" command to the BSS 60 as a BSSGP layer message (arrow 8). The existing BSSGP protocol does not currently define such a "perform location request" command; however, the BSSGP can be easily modified by those skilled in the art to provide this by adding an additional message to the BSSGP message set or, possibly, by modifying existing messages within the BSSGP message set to include new information elements.

The BSS 60 forwards this "perform location request" message to the SMLC 38 by using an appropriate BSSMAP-LE layer message (arrow 9). From this point, suitable messages are exchanged to facilitate the individual positioning method (box 10), as described in more detail with reference to FIG. 7 below. Once the SMLC 38 has the appropriate information, the SMLC 38 sends a "perform location response" message to the BSS 60 as a BSSMAP-LE layer message (arrow 11). The BSS 60 in turn forwards the information to the SGSN 32 as a BSSGP layer message (arrow 12). The SGSN 32 forwards the information to the LCS client via GMLC 40 (arrows 13–14).

Figure 7:
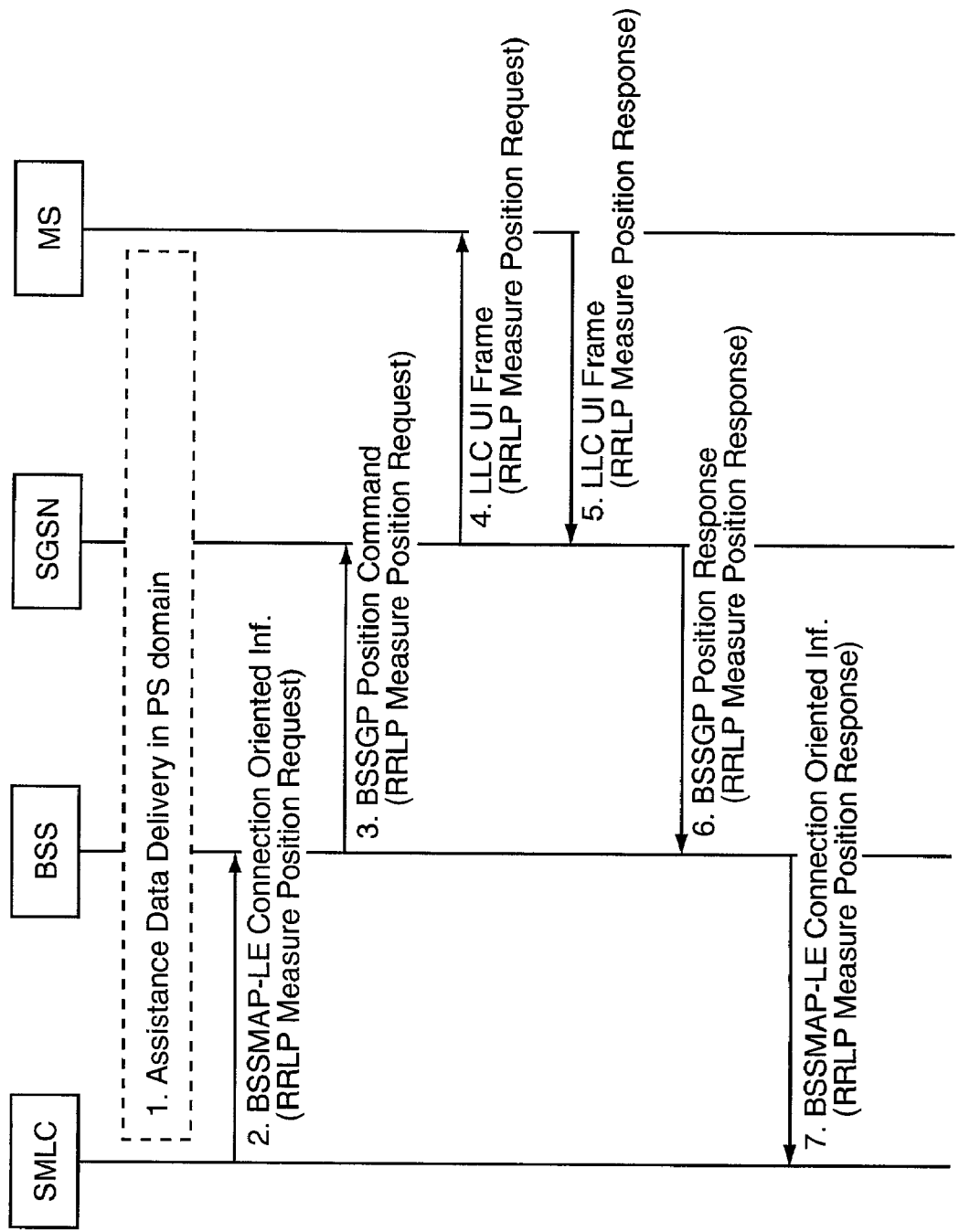
FIG. 7 is a call flow diagram illustrating a procedure for requesting position information from a mobile station.

Referring to FIG. 7 for greater detail on the messages exchanged to facilitate the individual positioning method, the SMLC 38 generates a location service message and transmits the same to the BSS 60 in a BSSLAP layer message (arrow 2). It will be assumed for this example that the location service message includes a "position request" command. The BSS 60 forwards the location service message to the SGSN 32 in a BSSGP layer message (arrow 3). The SGSN 32 forwards the location service message to the mobile station 80 in a LLC UI frame (arrow 4). It should be noted that the SGSN 32 may apply ciphering to the location service message as desired prior to forwarding. The Network layer Service Access Point Identifier NSAPI value for LCS may be used by the LLC. This communication of the location service message between the SGSN 32 and the mobile station 80 is via the BSS 60, but is basically transparent to the BSS 60. The mobile station 80 receives the location service message and responds thereto. In this simple example, the mobile station 80 performs the necessary position-related measurements (e.g., E-OTD measurements or GPS measurements) known in the art, and prepares an uplink location service message containing the measurement results and/or a mobile station-computed location estimate. This uplink location service message is transmitted to the SGSN 32 in a LLC UI frame (arrow 5). Once again, this communication between the mobile station 80 and the SGSN 32 is via the BSS 60, but is basically transparent to the BSS 60. The SGSN 32 forwards the location message to the BSS 60 in a BSSGP message (arrow 6), which then forwards it to the SMLC 38 in a BSSLAP message for appropriate processing (arrow 7).

Figure 8:
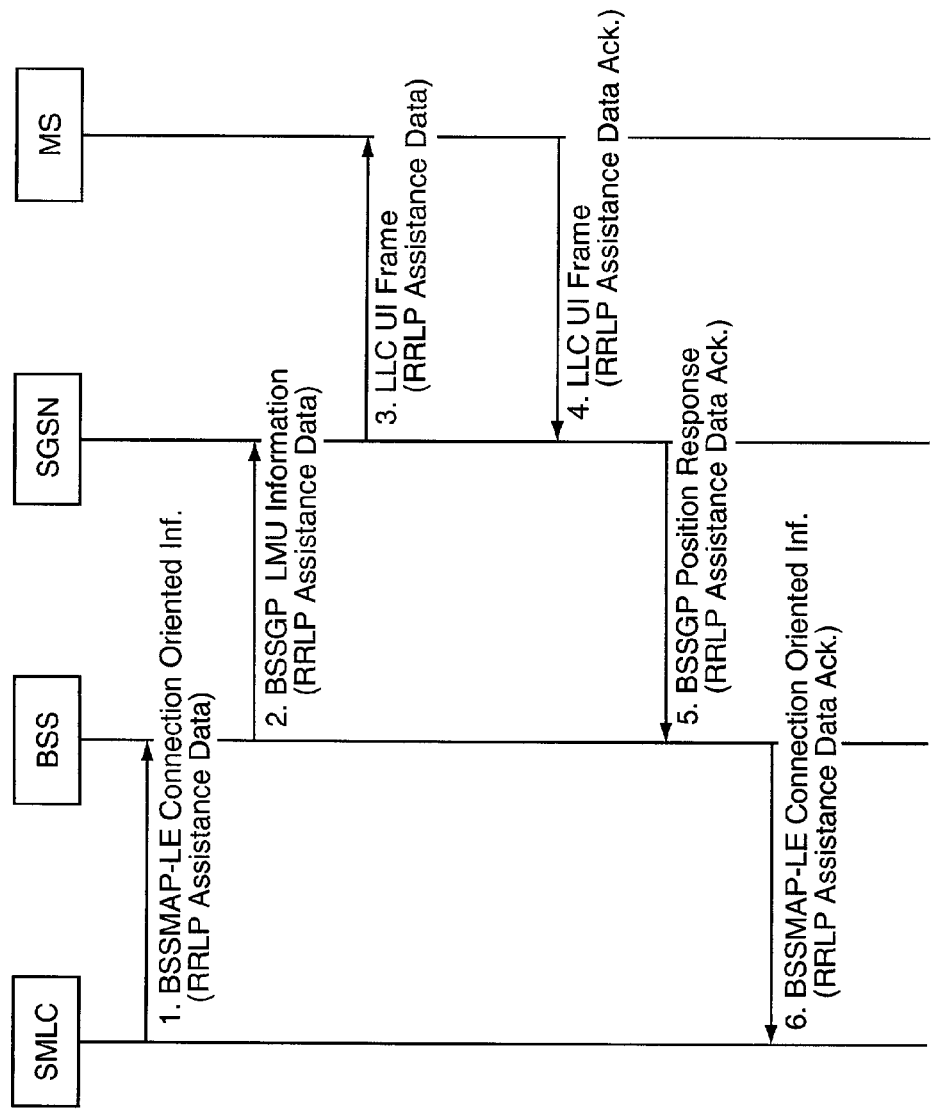
FIG. 8 is a call flow diagram illustrating a procedure for providing assistance data to a mobile station.

A location command/response scenario has been used for the discussion of FIG. 7 immediately above. However, the same basic flow may be used for supply/acknowledgement of location assistance data, as shown in FIG. 8. That is, the location service message from the SMLC 38 may contain location assistance data (e.g., GPS almanac or ephemeris data, position of other BSSs 60, etc.) and the uplink location message may contain a simple acknowledgement of receipt. It should also be noted that that the SMLC 38 may optionally precede the position request command/response cycle with a supply/acknowledgement cycle (using the process as shown in FIG. 8) to provide location assistance information determined to be useful by the SMLC 38 to the mobile station 80, as desired.

Figure 9:
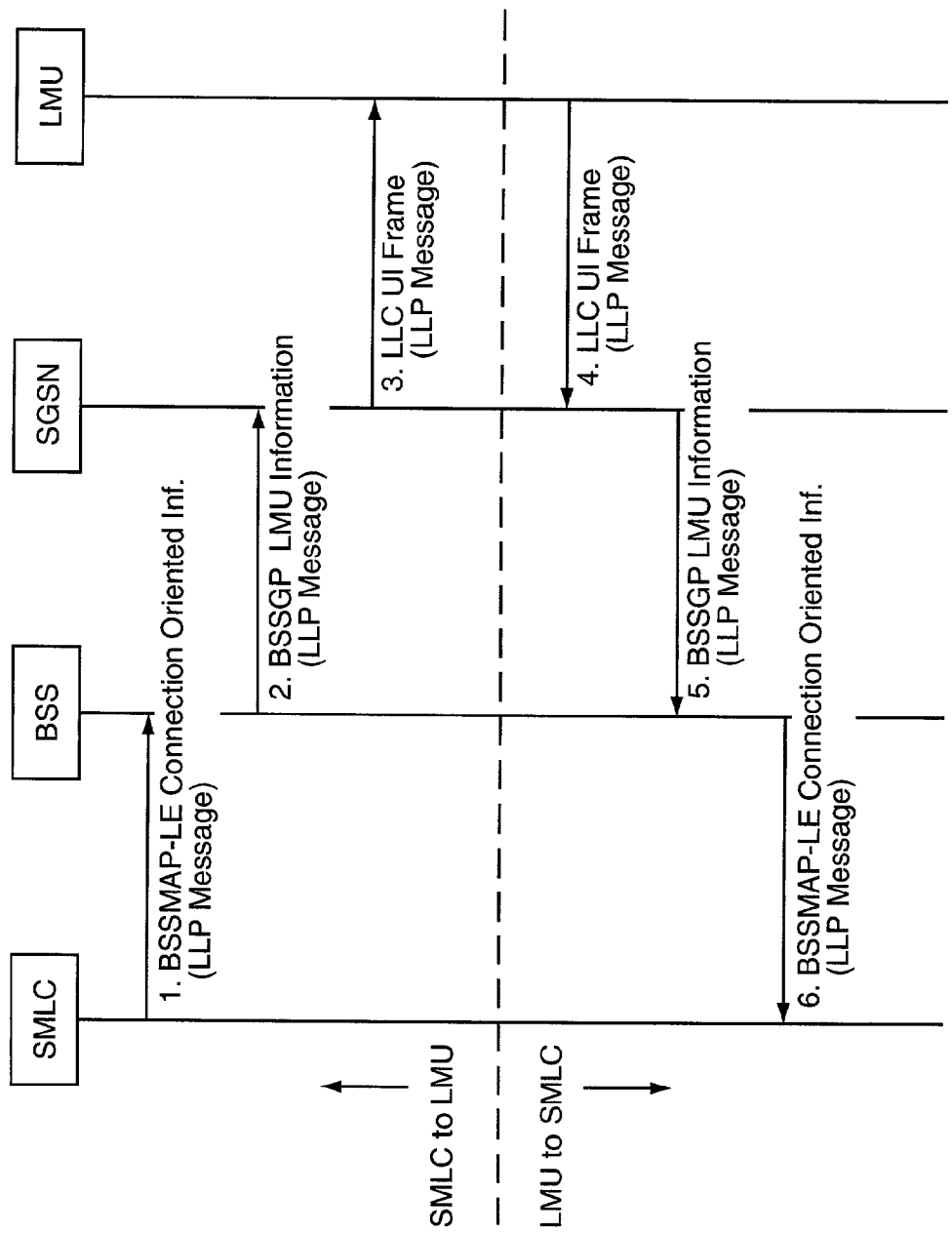
FIG. 9 is a call flow diagram illustrating a procedure for providing assistance data to an LMU.

The discussion above has assumed that the location service messages are flowing between a SMLC 38 and a mobile station 80; however, the same basic approach can be used for the flow of location service messages between an SMLC 38 and a type A LMU 70 by simply replacing the mobile station 80 with a Type A LMU 70 as shown in FIG. 3. It should be noted that for the flow of location service messages between an SMLC 38 and a type A LMU 70, there may not be an analogous flow to that of FIG. 6. For instance, the LMU 70 may be relatively continuously contacted by the SMLC 38, as appropriate; or, alternatively, the LMU 70 may be contacted by the SMLC 38 in connection with a position request, such as that shown in FIG. 6. Assuming a triggered connection approach, the the flow of location service messages between an SMLC 38 and the LMU 70 may advantageously take place between step 10 and step 11 of FIG. 6, and the SMLC 38 may ask one or more LMUs 70 about timing information that the mobile station 80 reported in step 10 of FIG. 6. The process flow of FIG. 7 may advantageously be altered as shown in FIG. 9 for the flow of location service messages between an SMLC 38 and a type A LMU 70. As shown in FIG. 9, the SMLC 38 generates a location service message (e.g., an LLP message) and transmits the same to the BSS 60 in a BSSLAP layer message (arrow 1). It will be assumed for this example that the location service message includes a "report BSS timing information" command. The BSS 60 forwards the location service message to the SGSN 32 in a BSSGP layer message (arrow 2). The SGSN 32 forwards the location service message to the LMU 70 in a LLC UI frame (arrow 3). This communication of the location service message between the SGSN 32 and the LMU 70 is via the BSS 60, but is basically transparent to the BSS 60. The LMU 70 receives the location service message and responds thereto. In this simple example, the LMU 70 performs the necessary position-related measurements (e.g., E-OTD measurements or GPS measurements) known in the art, and prepares an uplink location service message containing the measurement results. This uplink location service message is transmitted to the SGSN 32 in a LLC UI frame (arrow 4). Once again, this communication between the LMU 70 and the SGSN 32 is via the BSS 60, but is basically transparent to the BSS 60. The SGSN 32 forwards the location message to the BSS 60 in a BSSGP message (arrow 5), which then forwards it to the SMLC 38 in a BSSLAP message for appropriate processing (arrow 6).

It should be noted that FIG. 9 includes a dashed line figuratively separating the flow of messages from the SMLC 38 to the LMU 70 (above the line) and the flow of messages from the LMU 70 to the SMLC 38 (below the line). The process flow of FIG. 9 described above is for both above and below the line, based on an inquiry-response model initiated by or through the SMLC 38. However, in some instances, the LMU 70 may send one or more location messages to the SMLC 38, not in response to a specific inquiry from the SMLC 38, but instead at its own initiative, such as on a periodic basis or upon detection of a new satellite coming into view. Thus, the portion of FIG. 9 below the line may occur without, or independent of, the portion of FIG. 9 above the line in some instances.

The following documents are incorporated by reference herein and are part of the specification:

1. Digital cellular telecommunications system (Phase 2+); Location Services (LCS); (Functional description)—Stage 2 (GSM 03.71 version 8.0.0 Release 1999).

2. 3rd Generation Partnership Project; Technical Specification Group Services and System Aspects; Functional stage 2 description of LCS (Release 2000).

3. 3rd Generation Partnership Project; Technical Specification Group Services and System Aspects; General Packet Radio Service (GPRS); Service description; Stage 2 (Release 1999).

4. 3rd Generation Partnership Project; Technical Specification Group GSM EDGE Radio Access Network; General Packet Radio Service (GPRS); Base Station System (BSS)—Serving GPRS Support Node (SGSN); BSS GPRS Protocol (BSSGP) (Release 1999).

5. 3rd Generation Partnership Project; Technical Specification Group GSM EDGE Radio Access Network; Location Services (LCS); Base Station System Application Part LCS Extension (BSSAP-LE) (Release 1999).

6. Digital cellular telecommunications system (Phase 2+); General Packet Radio Service (GPRS); Mobile Station—Serving GPRS Support Node (MS-SGSN) Logical Link Control (LLC) layer specification (GSM 04.64 version 8.4.0 Release 1999).

7. Digital cellular telecommunications system (Phase 2+); General Packet Radio Service (GPRS); Base Station System (BSS)—Serving GPRS Support Node (SGSN) interface; Network Service (GSM 08.16 version 8.0.0 Release 1999).

8. 3rd Generation Partnership Project; Technical Specification Group GSM EDGE Radio Access Network; Location Services (LCS); Mobile Station (MS)—Serving Mobile Location Centre (SMLC) Radio Resource LCS Protocol (RRLP) (Release 1999).

9. 3rd Generation Partnership Project; Technical Specification Group GSM EDGE Radio Access Network; Location Services (LCS); Serving Mobile Location Centre—Base Station System (SMLC-BSS) interface; Layer 3 specification (Release 1999).

10. BSS+ Protocol Architecture to Support LCS in GPRS.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of transmitting a location service message between a location server and a mobile station in a packet data network, said method comprising:

transmitting said location service message from said location server to a base station subsystem;

forwarding said location service message from said base station subsystem to a serving GPRS support node; and forwarding said location service message from said serving GPRS support node to said mobile station.

2. The method of claim 1 wherein forwarding said location service message from said serving GPRS support node to said mobile station comprises encapsulating said location service message in a link control message and transmitting said link control message from said serving GPRS support node to said mobile station.

3. The method of claim 2 wherein transmitting said link control message from said serving GPRS support node to said mobile station comprises transmitting said link control message from said serving GPRS support node to said base station subsystem and relaying said link control message from said base station subsystem to said mobile station.

4. The method of claim 2 further comprising ciphering said link control message at said serving GPRS support node and deciphering said link control message at said mobile station.

5. A method of transmitting a location service message between a mobile station and a location server in a packet data network, said method comprising:

transmitting said location service message from said mobile station to said serving GPRS support node;

forwarding said location service message from said GPRS support node to a base station subsystem supporting said mobile station; and forwarding said location service message from said base station subsystem to said location server.

6. The method of claim 5 wherein transmitting said location service message from said mobile station to said serving GPRS support node comprises transmitting said location service message from said mobile station to said base station subsystem and relaying said location service message from said base station subsystem to said serving GPRS support node.

7. The method of claim 5 wherein transmitting said location service message from said mobile station to said serving GPRS support node comprises encapsulating said location service message within a link control message and transmitting said link control message from said mobile station to said serving GPRS support node.

8. The method of claim 7 further comprising ciphering said link control message at said mobile station and deciphering said link control message at said serving GPRS support node.

9. A communications network comprising:
   a location server providing location services to clients related to the location of mobile terminals in said communication network, said location server communicating with said mobile terminals via location service messages;
   a base station subsystem communicating with said location server and said mobile terminal, said base station subsystem receiving location service messages from said location server and said mobile station; and
   a support node providing packet data services to said mobile station, said support node receiving downlink location service messages from said base station subsystem and forwarding said downlink location service messages to said mobile station, said support node further receiving uplink location service messages from said mobile station and forwarding said uplink location service messages to said base station subsystem.

10. The communication network of claim 9 wherein said support node transmits said downlink location service messages to said mobile station as part of a link control message.

11. The communication network of claim 10 wherein said support node transmits said downlink link control messages to said mobile station transparently through said base station subsystem.

12. The method of claim 11 wherein said support node and said mobile station support ciphering and deciphering of link control messages.

13. A method of transmitting a location service message between a location server and a LMU in a packet data network, said method comprising:
   transmitting said location service message from said location server to a base station subsystem;
   forwarding said location service message from said base station subsystem to a serving GPRS support node; and
   forwarding said location service message from said serving GPRS support node to said LMU.

14. The method of claim 13 wherein forwarding said location service message from said serving GPRS support node to said LMU comprises encapsulating said location service message in a link control message and transmitting said link control message from said serving GPRS support node to said LMU.

15. The method of claim 14 wherein transmitting said link control message from said serving GPRS support node to said LMU comprises transmitting said link control message from said serving GPRS support node to said base station subsystem and relaying said link control message from said base station subsystem to said LMU.

16. The method of claim 14 further comprising ciphering said link control message at said serving GPRS support node and deciphering said link control message at said LMU.

17. A method of transmitting a location service message between a LMU and a location server in a packet data network, said method comprising:
   transmitting said location service message from said LMU to said serving GPRS support node;
   forwarding said location service message from said GPRS support node to a base station subsystem supporting said LMU; and
   forwarding said location service message from said base station subsystem to said location server.

18. The method of claim 17 wherein transmitting said location service message from said LMU to said serving GPRS support node comprises transmitting said location service message from said LMU to said base station subsystem and relaying said location service message from said base station subsystem to said serving GPRS support node.

19. The method of claim 17 wherein transmitting said location service message from said LMU to said serving GPRS support node comprises encapsulating said location service message within a link control message and transmitting said link control message from said LMU to said serving GPRS support node.

20. The method of claim 19 further comprising ciphering said link control message at said LMU and deciphering said link control message at said serving GPRS support node.

* * * * *